Figure 1:
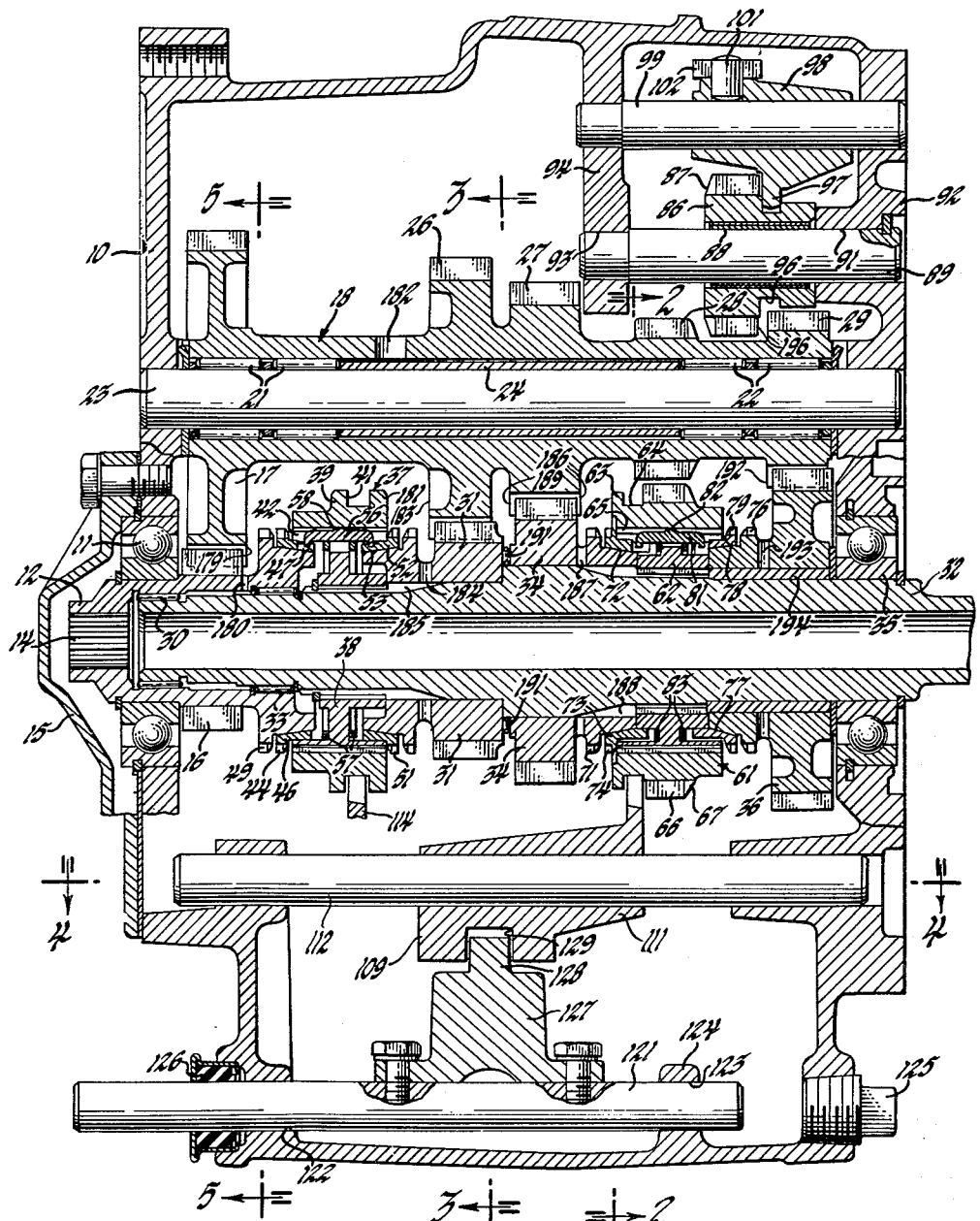

INVENTOR.
James W. Fodrea
BY
ATTORNEY

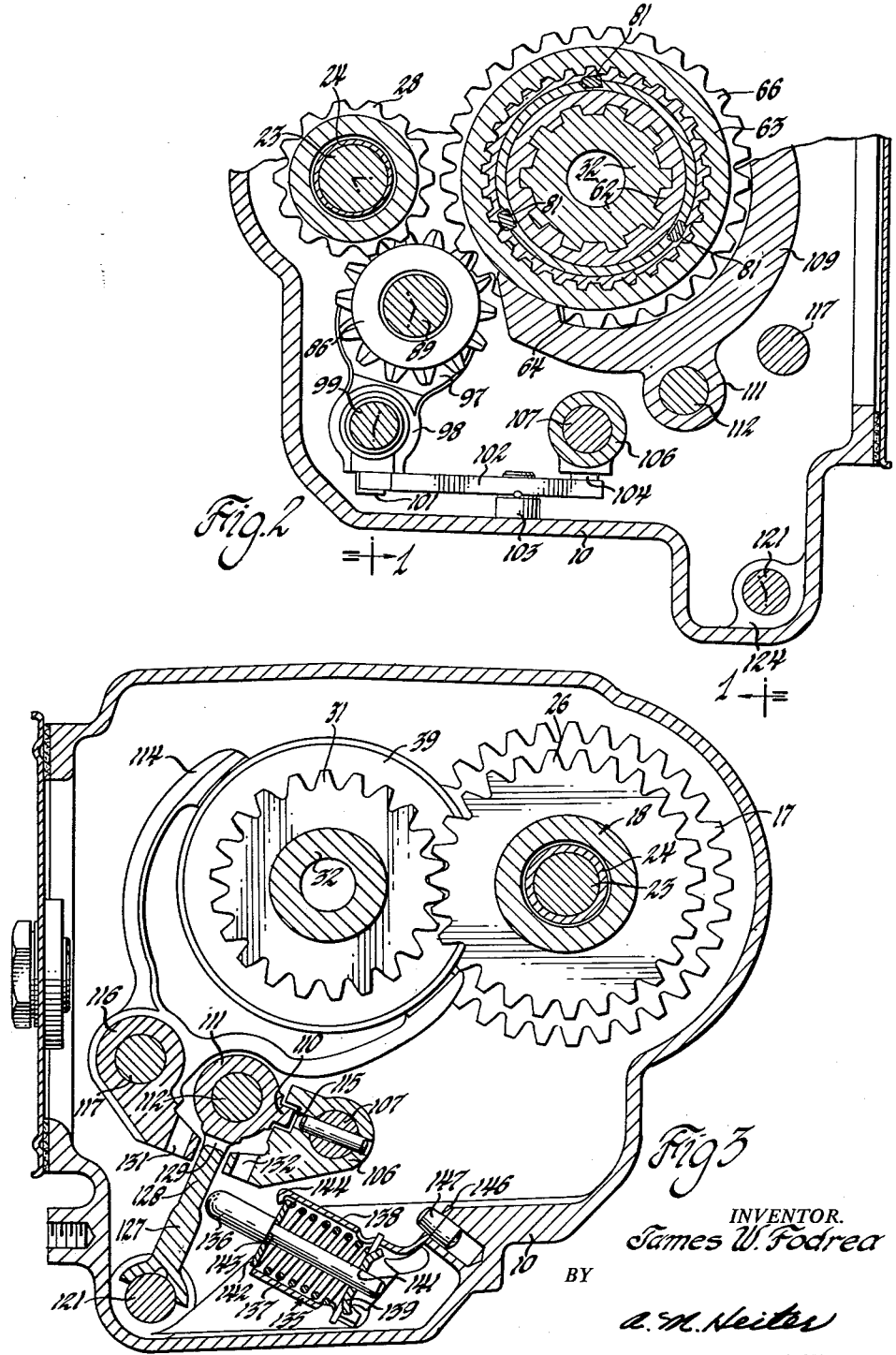

July 6, 1965  J. W. FODREA  3,192,788
TRANSMISSION

Filed Aug. 30, 1961  3 Sheets-Sheet 3

INVENTOR.
James W. Fodrea
BY
A. M. Weiter
ATTORNEY

United States Patent Office
3,192,788
Patented July 6, 1965

3,192,788
TRANSMISSION
James W. Fodrea, Rochester, Mich., assignor to General
Motors Corporation, Detroit, Mich., a corporation of
Delaware
Filed Aug. 30, 1961, Ser. No. 134,919
23 Claims. (Cl. 74—375)

This invention relates to a transmission and particularly a counter-shaft type multiratio gear transmission.

The invention is illustrated in a countershaft type synchromesh transmission providing four forward ratios and a reverse ratio. The third and fourth ratio or speed synchromesh unit is located in the space between the input gear which drives the countershaft input gear and the third ratio output gear which is driven by the third ratio countershaft gear and is rotatably mounted on the output shaft. The synchromesh unit construction has a short axial length so that these two gears may be closely spaced. The first and second ratio gear sets each have a gear fixed to the countershaft and rotatably mounted on the output shaft. A synchronizing unit having a small axial length is located between the gear sets so that the gear sets can be spaced as close together as possible. The clutch collar for shifting between first and second ratio has a reverse output gear at its outer periphery aligned with the reverse gear on the countershaft. There is just sufficient space between the reverse gear and the first speed gear on the countershaft for the reverse idler. The facing ends of the teeth, the leading edges which initially mesh when shifting the reverse idler into mesh with the reverse countershaft gear and the collar gear are tapered to prevent locking during engagement. When the second speed collar is shifted to the first speed position the reverse gear on the collar picks up the reverse idler in the disengaged position and rotates it. This arrangement permits locating the first and second speed gear sets the entire width of one gear closer together to reduce the overall length of the transmission. This makes it possible to reduce the weight of the transmission components and thus the inertia to improve the synchromesh action during shifting and the reliability of the transmission. The transmission is also lubricated by centrifugal force. Oil is thrown from the overhanging free edge of certain gears through an aperture in other gears or gear hubs with sufficient speed to directly impinge on the bearing surface. In this arrangement the reverse idler, when rotated in first ratio, helps lubricate the first ratio output gear. The three rail control mechanism and the reverse inhibitor is located in the lower portion of the transmission and is submerged in lubricant and completely lubricated at all times.

An object of the invention is to provide in a countershaft transmission including a pair of gear sets, each with one gear on the countershaft and one gear on the output shaft, and a clutching collar located between the gears on the output shaft having an external reverse gear arranged so that the external reverse gear is spaced only the width of one gear from the adjacent output shaft gear and a reverse idler gear between one gear set and the external reverse gear so that on a shift to one gear ratio the reverse gear collar engages the reverse idler gear.

Another object of the invention is to provide in a countershaft transmission, having a pair of gear sets each with one gear on one shaft and the other rotatable on the other shaft, a clutching collar between the gears on the other shaft having an external gear spaced only the width of one gear from one of the gear sets, an idler gear in said space engaged by the external gear on the clutching collar when the clutching collar is moved to engage the one gear set and the idler gear being movable to engage the external gear.

Another object of the invention is to provide in a transmission a three rail control mechanism located in the base of the transmission and submerged in lubricant.

Another object of the invention is to provide in a countershaft type transmission complete lubrication by throwing oil from the overhanging side wall of a plurality of rotating members at a speed to permit the oil drops to pass completely through the lubricant receiving aperture to impinge upon the shaft or bearing to completely lubricate all elements of the transmission.

Another object of the invention is to provide in a countershaft transmission a lubricating device to supply lubrication operative on a shift into a ratio to supply lubricant to the ratio gearing engaged.

Another object of the invention is to provide in a countershaft transmission, a member which is rotated on a shift into a ratio to centrifugally supply oil to lubricate the power transmitting gearing.

Another object of the invention is to provide an improved reverse detent located in the transmission housing inhibiting movement of the transmission control linkage to one position.

These and other objects of the invention will be more apparent from the following description and drawing of the preferred embodiment.

Figure 4:
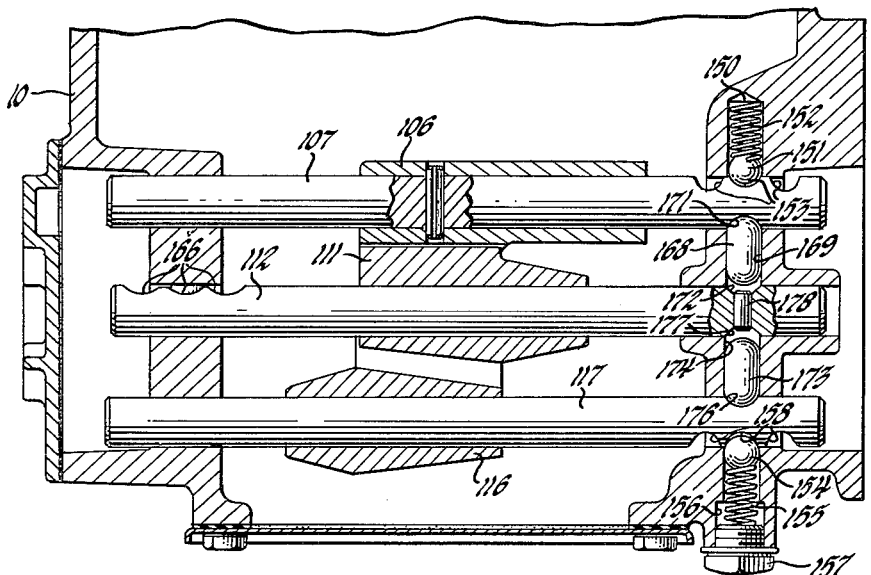
Figure 5:
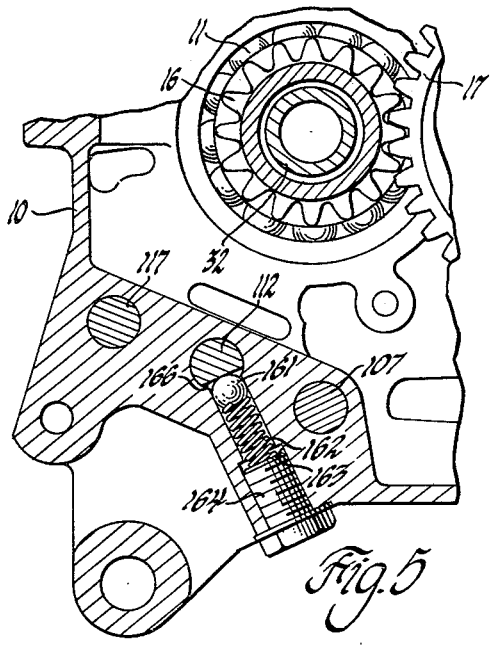
Figure 6:
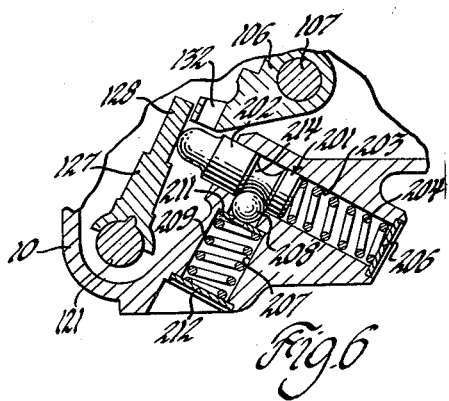

FIGURE 1 is a sectional view of the transmission taken on the line 1—1 of FIGURE 2.
FIGURE 2 is a partial section of FIGURE 1 on the line 2—2.
FIGURE 3 is a section of FIGURE 1 on the line 3—3.
FIGURE 4 is a partial section showing shift rails.
FIGURE 5 is a partial section showing the detent.
FIGURE 6 is a partial section of a modification.

The invention is illustrated in a four speed and reverse counter-shaft type transmission in which the four forward speeds are synchronized. The transmission housing 10 has in one end wall a bearing 11 rotatably supporting the input member 12 which is connected by the splines 14 to the input shaft, not shown, which is inserted in the output sleeve shaft 32. A closure plate 15 is suitably secured to the transmission end wall to seal the aperture in the housing for bearing 11. The input member 12 has an input gear 16 driving the input countershaft gear 17 which is formed as an integral part of the countershaft cluster gear unit 18 rotatably mounted by bearings 21 and 22 on the countershaft 23 and sealed in suitable apertures in the end walls of the housing 10. A spacer sleeve 24 on the support shaft 23 maintains the spacing between the bearings 21 and 22.

The cluster gear 18 has in addition to the input gear 17 a third speed countershaft gear 26, a second speed countershaft gear 27, a reverse countershaft gear 28 and a first speed countershaft gear 29. The third speed countershaft speed 26 meshes with the third gear output gear 31 rotatably mounted on the output sleeve shaft 32 which is rotatably mounted by needle bearings 30 and 33 on input member 16 and by ball thrust bearing 35 mounted on the other or rear end wall 92 of the transmission housing. The second speed countershaft gear 27 meshes with the second speed output gear 34 which is rotatably mounted on the output shaft 32. The first speed countershaft gear 29 meshes with the first speed output gear 36 rotatably mounted on the output shaft 32.

The third and fourth speed synchronizing unit 37 is located on the output shaft between the third speed output gear 31 and the input gear 16. The synchronizing unit has a hub 38 splined and axially located by a snap ring to the output shaft 32 and a shift collar 39 splined to and axially movable on the external periphery of the hub 38. The collar has on its external periphery an annular groove 41 which cooperates with the shift fork 114 as explained below. The internal splines 42 provide fourth speed and third speed clutch teeth. The fourth ratio balking teeth 44 are on the synchronizing ring or cone 46 which engages the cone surface 47 on the input member 12. The fourth speed clutch teeth 49 are fixed on the input member just beyond the cone surface 47. On a third ratio shift the splines 42 cooperate with the balking teeth 51 on the third speed synchronizing ring or cone 52 which engages the conical surface 53 on the third speed gear 31. The third speed clutch teeth 54 are mounted on the gear member 31 adjacent the conical surface 53. Three key members 56 are held in axial grooves in the hub 38 and collar 39 by a pair of annular spring members 57 and are normally held in the central position shown by the detent 58.

When the collar 39 is moved toward the input member the key 56 is resiliently retained for movement with the collar 39 by the detent 58 and engages the synchronizing cone 46 to urge it into engagement with the surface 47 to cause the collar 49 to rotate at the same speed as the input member 12 for synchronization which permits the spline 42 on the collar to pass through the balking teeth 44 and engage the clutch teeth 49 on input member to engage fourth ratio. Third ratio is similarly engaged by moving the collar to the right so that the key 58 engages the synchronizing cone 52 with the cone surface 53 on the third speed gear 31. When the collar 39 and the gear 31 are rotating at the same speed, the clutch teeth 43 will pass through the balking teeth 51 and engage the clutch teeth 54 on the gear 31 to engage third ratio.

The first-second speed synchronizer 56 is located concentrically on the output shaft 32 between the first speed output gear 36 and the second speed output gear 34. The synchronizing mechanism 61 is similar and has a hub 62 splined to the output shaft 32 and a collar 63 splined to the hub 62. The collar has internal splines or teeth 65, an external annular groove 64 which receives the first-second speed clutch fork 109 and an external reverse gear 66 having teeth with tapered leading edges 67. The second speed gear 34 has clutch teeth 71 and a coned surface 72 on which the synchronizing cone 73 having balking teeth 74 is mounted. The first speed gear has clutch teeth 76 and a cone surface 77 on which the synchronizing cone 78 which has balking teeth 79 is mounted. Three keys 81 fitting in grooves in the collar 63 and hub 62 have a detent 82 engaging the collar 63 which resiliently holds the key and collar together during movement of the collar. The annular spring rings 83 resiliently hold the key in the position shown with the detent in engagement.

When the one-two shift collar 63 is moved to the left, the key 81 is resiliently moved with it due to the action of the detent 82 to apply a limited force to engage the synchronizing cone 73 with the synchronizing surface 72 on second speed gear 34 to synchronize the speed of the collar 63 and gear 34 permitting the internal splines 65 on the collar 63 to pass through the balking teeth 74 and engage the clutch teeth 71 to connect the output shaft 32 to the second speed gear 34 for second ratio. When the first-second speed clutch collar 63 is moved to the right, the key 81 is moved with it by the detent biasing force to engage the synchronizing cone 71 and moving it into frictional engagement with the cone surface 71 on the first speed gear 36 to synchronize the collar 62 and first speed gear 36. When synchronization is completed, the balking teeth 79 permit internal splines 65 on the collar 63 to pass through to engage the clutch teeth 76 on the first speed gear to establish first speed ratio.

The reverse idler gear 86 having teeth with a tapered leading edge 87 is mounted by a bearing 88 on the reverse idler shaft 89. The reverse idler shaft is mounted and keyed in a suitable aperture 91 in the rear wall 92 of the transmission and in a suitable aperture 93 in the support portion 94 extending from the casing and located between the second speed countershaft gear 27 and the reverse countershaft gear 28.

The reverse idler gear 86 has a hub with an annular groove 96 cooperating with the reverse fork 97 which has a guide portion 98 slidably mounted on the support shaft 99 which is secured in suitable apertures in the rear wall 92 and the support portion 94. The guide 98 is connected by a pivot pin 101 to the lever 102 which is pivotally mounted (FIGURE 2) by pivot pin 103 mounted in the bottom of housing 10. The other end of the lever 102 is connected by a pin 104 to the reverse guide 106 which is fixed on the reverse shift rail 107. The first-second shift fork 109 fits in the groove 64 of the first-second shift collar 63 and has integrally formed therewith the guide portion 111 fixed on the first-second shift rail 112. The third-fourth shift fork 114 engages the groove 41 of the third-fourth shift collar 39 and has a guide portion 116 fixed on the third-fourth shift rail 117. The third-fourth ratio fork 114 engages the groove 41 in the collar 39 to prevent rotation of the guide 116 and shift rail 117. The first-second fork 109 similarly prevents rotation of guide 111 and shift rail 112. The guide 111 has a projection 110 fitting an axially extending recess 115 only of sufficient length to permit the necessary reverse shift which prevents rotation of guide 106. The shift control rod 121 is rotatably and reciprocally mounted in an aperture 122 in the lower forward wall of the transmission housing 10, and in an aperture 123 in a support 124 projecting from the lower wall of the transmission housing. A seal 126 prevents leakage of lubricating oil through the aperture 122 around control rod 121. The drain plug 125 is located at the other end of the bottom of the housing. The control rod 121 has suitably secured thereto an operating lever 127 having an operating tongue 128 normally positioned in a recess 129 in the guide 111 for the first-second shift fork 109. When the lever 127 is rotated by rotary movement of the control rod 121, counterclockwise, as shown in FIGURE 3, the tongue 128 engages the recess 131 in the guide 116 for the third-fourth shift fork 114 to select third or fourth ratios. When the control rod 121 and lever 127 are rotated clockwise, the tongue 128 enters the recess 132 of the reverse guide 106, which is connected through lever 102 to actuate the reverse idler fork 97.

This selecting movement of the lever 127 to select reverse gear is resisted by a reverse inhibitor 135 having a plunger 136 biased to the position sown by a spring 137. Spring 137 is mounted in a generally cylindrical housing 138 having a fixed abutment 139 having a suitable aperture 141 to guide the inhibitor pin 136. The movable abutment 142 is engaged by the spring and urged against the shoulder 143 on the pin 136 to bias the pin into engagement with the lever 127. A stop 144 limits movement of the pin 136 so that it does not tend to move the lever 127 beyond the first-second speed position, shown in FIGURE 3. The inhibitor unit has a support tab 146 secured to the housing 10 by a fastener 147.

The detent mechanism for the shift rails is shown in FIGURES 4 and 5. A ball detent 151 loaded by a spring 152 located in blind bore 150 cooperates with a group of three grooves 153 in the reverse shift rail 107 to resiliently hold the rail in the neutral position with the detent engaging the center groove and to permit movement to the reverse position. The ball detent 154 is loaded by a spring 155 held in a bore 156 in the housing by a plug 157. The detent 154 cooperates with three grooves 158 in the third-fourth shift rail 117 and is in the position shown in neutral and may be moved in either direction to engage an end groove for the third or fourth ratio position. The ball detent 161 is biased by a spring 162 retained in a bore 163 by a plug 164 to engage the grooves 166 of the first-second shift rail 112. The ball normally holds the first-second shift rail 112 in the neutral position shown and permits movement to engage either of the other grooves for the first or second ratio position. The interlock mechanism prevents movement of any of the shift rails when one rail is not in the neutral position. This mechanism employs a cam member 168 mounted in a bore 169 in the housing for engagement with a recess 171 in the rail 107 or a recess 172 in the rail 112. A similar cam 173 is located in a bore 174 in the transmission housing and cooperates with the groove 176 in the rail 117 or a groove 177 in the rail 112. A pin 178 is located in a suitable bore in the rail 112 and aligned with the cam members 168 and 173. When the center shift rail 112 is moved from the neutral position, shown in FIGURE 4, this rail moves both cams 168 and 173 outwardly to the position shown holding both rails 107 and 117 in neutral. When one of the side rails, such as rail 117, is moved, it moves the cam member 173 into groove 177 to hold rail 112 in position and moves the pin 178 to move the cam member 168 into the groove 171 of rail 107 to hold the rail 107 in neutral.

The transmission is lubricated by centrifugally throwing oil from the side surfaces and the overhanging portion of gear teeth at a speed sufficient to enter the lubrication receiving apertures and pass through these apertures without contacting the side walls thereof to impinge upon the internal shaft or bearing surface directly under the aperture. The countershaft bearings 21 and 22 are lubricated by throwing oil from the side surface 181 of the collar 39 into the lubricating aperture 182 when the output shaft is driven. The forward output shaft bearings 30 and 33 are lubricated by throwing oil from the side surface 179 of gear 17 through circumferentially elongated aperture 180. The side surfaces and exposed gear teeth portions 183 of the third speed countershaft gear 26 throw oil into the circumferentially elongated oil slot 184 at sufficient speed so the oil passes through the slot 184 and is trapped in the space 185 and fed to the bearing surfaces of third speed gear 31 and output shaft 32. The side 186 of gear 27 also overhangs gear 34 and throws oil through elongated slot 187 to space 188 to lubricate the bearing surfaces of gear 34. Oil is centrifugally thrown from the side surface and exposed gear teeth 189 of second speed countershaft gear 27 to oil needle bearing 191 between the second and third speed output gears. Oil is slung from the side surface and overhanging gear portion 192 of the first speed countershaft gear to pass through elongated aperture 193 in the first speed output gear 36 to lubricate the gearing 194 before the first speed gear 36.

Thus the output shaft bearings and output gear bearings will be lubricated whenever the input is rotating. The edge 196 of reverse idler gear 86, when the gear is rotated on a shift into first ratio, throws additional oil through circumferentially elongated slot 193 to provide additional lubricant to the bearing 194 for the first ratio output gear 36 only when the transmission is shifted into first ratio.

This arrangement provides low pressure lubrication for the transmission gearing permitting a reduction of bearing areas and axial length. The compact arrangement of the first and second speed output and countershaft gear sets and the synchronizing mechanism therebetween reduces the length of the transmission and the length of the output shaft permitting a reduction in weight and inertia of all parts involved. The actual length of the synchronizing unit 61 is reduced to a minimum while still providing bearing support for the first speed output gear 36 and the second speed output gear 34 and sufficient spline length for the hub 62 and the clutch collar 63 and cooperating clutch teeth. Sufficient room is provided on one side of the synchronizing collar having the external reverse output gear so that the reverse idler gear may be located between them.

The modified reverse shift inhibitor mechanism illustrated in FIGURE 6 is located in the transmission assembly in the same location as the inhibitor 135 shown in FIGURE 3 and described above. Inhibitor 201 has a plunger 202 reciprocally mounted in a bore 203 and biased by a spring 204 engaging the plunger and a closure 206 for the bore which may be a press fit plug as shown, or an adjustable screw plug. A detent mechanism is located in a bore 207 located transversely to the bore 203. The detent mechanism consists of a ball 208 biased by a spring 209 to the engaged position shown. Spring 209 transmits the biasing force through the washer 211 to ball 208 and is retained in the bore by a plug 212 which may be a press fit plug, as shown, or an adjustable screw plug. The detent ball 208 engages the groove 214 in the plunger 202 to resiliently retain the plunger in the position shown inhibiting movement of the shift lever 127 to the reverse position. When a shift is made into reverse, the resistance of the detent mechanism must be overcome to initiate the shift movement, but thereafter the detent ball 208 rides on the smooth external surface of the plunger 202 so that no further resistance to the shifting movement during shifting into reverse is provided by the detent. The spring 204 is weak so that little resistance to shifting into reverse is encountered after the detent is released, but has sufficient strength to return the plunger 202 to the initial position shown on a shift out of reverse.

The above described invention may be modified within the scope of the appended claims.

I claim:

1. In a transmission, an input member, an output member, an input gear driven by said input member, an output gear rotatably mounted on said output member and meshing with said input gear, clutch means on said output member and said output gear having a clutch member mounted for rotation with said output member and spaced from said output gear in neutral and movable toward said output gear to engaged position to connect said output gear to drive said output member, a reverse output gear mounted on said clutch member, a reverse input gear on said input member, said reverse output gear in said neutral position being transversely aligned with said reverse input gear, a reverse idler gear mounted in neutral position between said reverse output gear and said output gear and shiftable to mesh with said reverse output and reverse input gears, said reverse output gear being spaced from said output gear not substantially more than the width of said reverse idler gear and said reverse output gear on moving with said clutch member from neutral to engaged position of said clutch member meshing with said reverse idler gear.

2. The invention defined in claim 1 and bearing means supporting said output gear and means operative in response to movement of said clutching member from said neutral position to said engaged position to supply lubricant to said bearing means.

3. The invention defined in claim 1 and bearing means supporting said output gear having means to receive lubricant centrifugally thrown by said reverse idler gear.

4. In a transmission, an input member, an output member, an input gear driven by said input member, an output gear rotatably mounted on said output member and meshing with said input gear, clutch means on said output member and said output gear having a clutch member driving said output member and spaced from said output gear in neutral and movable toward said output gear to engaged position to connect said output gear to drive said output member, a reverse output gear mounted on said clutch member, a reverse input gear on said input member transversely aligned with said reverse output gear when said clutch member is in said neutral position, a reverse idler gear mounted in neutral position between said reverse output gear and said output gear and shiftable to mesh with said reverse output and reverse input gears, said reverse output gear being spaced from said output gear not substantially more than the width of said reverse idler gear and said reverse output gear on moving with said clutch member from neutral to engaged position of said clutch member meshing with said reverse idler gear.

5. In a transmission, an input member, an output member, a first input gear driven by said input member, a first output gear rotatably mounted on said output member and meshing with said first input gear, clutch means on said output member and said first output gear having a clutch member driven by said output member and spaced from said first output gear in neutral and movable toward said first output gear to engaged position to connect said first output gear to drive said output member, a second output gear mounted on said clutch member, a second input gear on said input member transversely aligned with said second output gear when said clutch member is in said neutral position, an idler gear mounted in neutral position between said second output gear and said first output gear and shiftable to mesh with said second output and input gears, said second output gear being spaced from said first output gear not substantially more than the width of said idler gear and said second output gear on moving with said clutch member from neutral to engaged position of said clutch member meshing with said idler gear.

6. In a transmission, an input member, an output member, a first gear drivingly connected to one member, a second gear rotatably mounted on the other member and meshing with said first gear, clutch means on said other member and said second gear having a clutch member spaced from said second gear in neutral and movable toward said second gear to engaged position to connect said second gear to transmit drive to said other member, a third gear mounted on said clutch member, a fourth gear on said one member transversely aligned with said third gear when said clutch member is in said neutral position, an idler gear mounted in neutral position between said third gear and said second gear and shiftable to mesh with said third and first gears, said third gear being spaced from said second gear not substantially more than the width of said idler gear and said third gear on moving with said clutch member from neutral to engaged position of said clutch member meshing with said idler gear.

7. In a transmission, an input member, an output member, an input gear driven by said input member, an output gear rotatably mounted on said output member and meshing with said input gear, clutch means on said output member and said output gear having a clutch member mounted for rotation on said output member and spaced from said output gear in neutral and movable toward said output gear to engaged position to connect said output gear to drive said output member, a reverse output gear mounted on said clutch member, a reverse input gear on said input member, said reverse output gear in said neutral position being aligned with said reverse output gear, a reverse idler gear mounted in a neutral position between said reverse output gear and said output gear and shiftable to mesh with said reverse output and reverse input gears, said reverse output gear being spaced from said output gear a distance substantially equal to the width of said reverse idler gear and said reverse output gear on moving with said clutch member from neutral to engaged position of said clutch member meshing with said reverse idler gear.

8. In a transmission, a housing, an output shaft rotatably supported in said housing, an input driven countershaft rotatably supported on said housing adjacent and parallel to said output shaft, a first ratio gear set having an output gear rotatably mounted on said output shaft and a countershaft gear driven by said countershaft and meshing with said first ratio output gear, a second ratio gear set having an output gear rotatably mounted on said output shaft and a countershaft gear driven by said countershaft and meshing with said second ratio output gear, synchromesh means rotatable with said output shaft and having a clutch member axially slidable with respect to said output shaft from a central position to a first or a second position located adjacent said first and second ratio gear sets respectively, having means to clutch said output shaft to said first output gear on movement from said central position to said first position and to said second output gear on movement from said central position to said second position, a reverse countershaft gear mounted on said countershaft centrally between said first and second ratio countershaft gears, a reverse output gear mounted on said clutch member and located in alignment with said reverse countershaft gear when the clutch member is in the central position, a reverse idler gear in neutral position located between said reverse output gear in said central position and said first output gear and movable to mesh with said reverse countershaft and said reverse output gears in reverse position and said reverse output gear and first output gear being spaced apart a distance not substantially greater than the width of said reverse idler gear, to substantially reduce the length of the output shaft between said first and second ratio gear sets.

9. The invention defined in claim 8 and bearing means supporting each of said output gears on said output shaft having a lubricant receiving aperture, said countershaft gears overhanging said output gears to centrifugally throw oil into said apertures.

10. The invention defined in claim 8 and bearing means supporting said first output gear having a lubricant receiving aperture aligned with a side surface of said reverse idler gear in said neutral position and a side surface of said first countershaft gear to receive lubricant thrown from both gears.

11. In a transmission, an input member, an output member, means connectitng said input and output members including a gear transmitting load rotatably supported on a bearing means, means to supply oil to lubricate said bearing means, clutch means inoperative in a neutral position and operative on movement from said neutral position to an engaged position to clutch said output member and said gear and operative during clutching to actuate said means to supply oil to lubricate said bearing means of said gear.

12. In a transmission, a housing, an input gear mounted in said housing, an output shaft mounted on said housing, an output gear rotatably mounted on said output shaft and meshing with said input gear, a clutching means including a clutching member operable to connect said output shaft to said output gear for one ratio, an idler gear rotatably mounted on said housing for another gear ratio, means on said clutching member to rotate said idler gear to provide additional centrifugally supplied lubricant to lubricate the output gear when the clutching member is moved to clutch the output gear to the output shaft for said one ratio.

13. In a transmission, an input countershaft having a plurality of forward input gears, an output shaft having a plurality of forward output gears rotatably mounted on said output shaft and each meshing with a forward input gear, said forward output gears having hub means having a circumferentially elongated aperture and bearing means inside said hub, said input gears overhanging the meshing output gear to centrifugally throw lubricant at sufficient speed to pass through said aperture and impinge on said bearing means.

14. In a transmission, an input countershaft having a forward input gear and a reverse input gear, an output shaft having a forward output gear rotatably mounted on said output shaft in mesh with said forward input gear, and a reverse output gear fixed on said output shaft, said forward output gear having hub means having a circumferentially elongated aperture extending from the outside to the inside of said hub and bearing means inside said hub, said input gear overhanging the meshing output gear to centrifugally throw lubricant at sufficient speed to pass through said aperture and impinge on said bearing means, an idler gear positioned to centrifugally throw lubricant through said aperture, means to connect said forward output gear and said output shaft for a drive being operative to rotate said idler gear.

15. In a transmission, a housing, an input countershaft rotatably mounted on said housing and having a driven gear and three forward input gears and a reverse input gear, a drive gear rotatably mounted on said housing and meshing with said driven gear to drive said countershaft, an output shaft rotatably mounted on said drive gear and said housing having three forward output gears rotatably mounted on said output shaft and each meshing with a forward input gear and a reverse output gear rotatably fixed to said output shaft, clutch means to selectively connect said forward output gears to and said drive gear to said output shaft, said drive gear having hub means having a circumferentially elongated aperture and bearing means supporting said output shaft on said drive gear, said driven gear overhanging said drive gear and centrifugally throwing lubricant through said aperture to impinge on said bearing means, a plurality of said forward output gears each having hub means having a circumferentially elongated opening connected to gear bearing means supporting a forward output gear on said output shaft, a plurality of said forward input gears overhanging the meshing output gears and centrifugally throwing lubricant through said openings to impinge on said gear bearing means, a reverse idler gear rotatably mounted on said housing in a normal position and shiftable to engage said reverse iinput and output gears, said clutch means on shifting to one ratio moving said reverse output gear to engage and rotate said reverse idler gear to centrifugally throw lubricant through one of said openings.

16. In a transmission, a housing, an input countershaft rotatably mounted on said housing and having a driven gear and three forward input gears, a drive gear rotatably mounted on said housing and meshing with said driven gear to drive said countershaft, an output shaft rotatably mounted on said drive gear and said housing having three forward output gears rotatably mounted on said output shaft and each meshing with a forward input gear, clutch means to selectively connect said forward output gears to and said drive gear to said output shaft, said drive gear having hub means having a circumferentially elongated aperture and bearing means supporting said output shaft on said drive gear, said driven gear overhanging said drive gear and centrifugally throwing lubricant through said aperture to impinge on said bearing means, a plurality of said forward output gears each having hub means having a circumferentially elongated opening connected to gear bearing means supporting said forward output gears on said output shaft, and a plurality of said forward input gears overhanging the meshing output gears and centrifugally throwing lubricant through said openings to impinge on said gear bearing means.

17. In a transmission, a housing, an input member rotatably mounted centrally on the forward wall of said housing, an output shaft rotatably mounted coaxially on said input member and centrally on the rear wall of said housing, a countershaft rotatably mounted on said housing laterally of said output shaft, multiratio and reverse gearing interconnecting said countershaft and output shaft having a forward control member and a reverse control member, a pair of shift rails mounted in said housing below and parallel to said output shaft and being submerged in lubricant, a control rod rotatably and axially movably mounted in said housing parallel to and below said rails having a shift lever movable between forward and reverse positions, means connecting said shift lever to said control members to shift said gearing, and spring biasing means located in the bottom of said transmission resisting movement of said shift lever to said reverse position.

18. The invention defined in claim 17 and said spring biasing means including a cage secured to said housing, a plunger engaging said shift lever, a spring confined in said cage and biasing said plunger to resist movement of said shift lever only from neutral to reverse position.

19. The invention defined in claim 17 and a plunger located in a bore in said housing and biased by a spring to lightly engage said shift lever, a detent engaging said plunger to resiliently hold said plunger against initial movement from the neutral position toward the reverse position.

20. The invention defined in claim 11 and said clutch means including synchronizing clutch means operative to synchronize said output member and said gear and drive clutch means operative to provide a drive between said gear and output member and said clutch means operative to actuate said means to supply oil to lubricate said bearing means only during operation of at least one of said synchronizing clutch means and said drive clutch means.

21. The invention defined in claim 11 and said clutch means including synchronizing clutch means operative to synchronize said output member and said gear and drive clutch means operative to provide a drive between said gear and output member and said clutch means operative to actuate said means to supply oil to lubricate said bearing means only during operation of both of said synchronizing clutch means and said drive clutch means.

22. The invention defined in claim 11 and said means to supply oil to lubricate said bearing means being a rotatable member rotated by said clutch means.

23. The invention defined in claim 11 and said means to supply oil to lubricate said bearing means being a rotatable gear rotated by said clutch means.

No references cited.

DON A. WAITE, *Primary Examiner*.

UNITED STATES PATENT OFFICE
CERTIFICATE OF CORRECTION

Patent No. 3,192,788 July 6, 1965

James W. Fodrea

It is hereby certified that error appears in the above numbered patent requiring correction and that the said Letters Patent should read as corrected below.

Column 2, line 54, for "speed 26 meshes with the third gear" read -- gear 26 meshes with the third speed --; column 4, line 44, for "sown" read -- shown --.

Signed and sealed this 15th day of March 1966.

(SEAL)
Attest:

ERNEST W. SWIDER
Attesting Officer

EDWARD J. BRENNER
Commissioner of Patents